Figure 1:
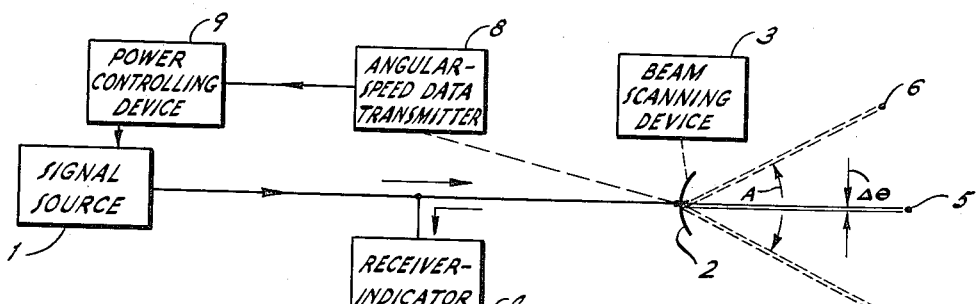

March 6, 1956 C. E. DOLBERG 2,737,655
ENERGY RADIATION SYSTEM
Filed March 29, 1950

INVENTOR.
CHARLES E. DOLBERG
BY
ATTORNEY

United States Patent Office 2,737,655
Patented Mar. 6, 1956

2,737,655

ENERGY RADIATION SYSTEM

Charles E. Dolberg, North Hills, Pa., assignor to Philco Corporation, Philadelphia, Pa., a corporation of Pennsylvania Application March 29, 1950, Serial No. 152,588

9 Claims. (Cl. 343—17.1)

The present invention relates to systems employing directional radiators of energy which are controllable to vary the direction of radiation thereby, and particularly to object-detecting systems in which the orientation of the directional axis of a radiating antenna is subject to variations at a non-uniform angular speed.

It is well-known in the prior art to employ, for certain purposes, directional antennas characterized in that they transmit signals supplied thereto principally in certain directions, and in that they receive more efficiently signals arriving from these same directions. Such, for example, is commonly the case in radar systems for the detection and location of target objects, in which the transmitted high-frequency signal is confined within a beam of predetermined angular width. It is also common in the radar art to accomplish illumination and exploration of a relatively large region of space by varying the orientation of a relatively narrow antenna beam so as to effect scanning of the region.

Although conventional systems operating in this manner may be satisfactory for certain applications in which the orientation of the antenna beam is varied uniformly, as by continued rotation at a uniform angular speed, such arrangements possess inherent features which may be highly disadvantageous in certain other applications in which the antenna beam is varied non-uniformly. An application of the latter type occurs, for example, in a conventional radar system employing sector scanning, in which the antenna beam is caused to oscillate between two extreme angular positions which represent the boundaries of the sector. It has been observed that, in such sector-scanning radar system, in which the strengths of indications produced by the receiver-indicator depend upon the amount of energy received from corresponding signal-reflective objects, the strengths of indications of objects near the extremes of the scanned sector may be considerably greater than those of indications of equivalent objects at the same range but located nearer the center of the sector, an effect which is particularly marked when the scanning rate is high.

That such non-uniformity in the strengths of indications of equivalent objects produced under the cathode-ray tube of a radar indicator may constitute a significant operational disadvantage will be appreciated from the following. The composite signal applied to the radar cathode-ray tube indicator normally comprises desired signals due to target objects of interest, such as aircraft, superposed upon undesired signals or "clutter," usually produced by reflections from land or sea and generally present at all angles within the scanned sector. In radar systems employing uniformly rotating antennas, it is common practice to obtain best indications of target objects by adjusting the background illumination of the cathode-ray tube to an optimum value such that relatively weak land and sea return signals do not exceed, to any substantial extent, the threshold level of the indicator for which appreciable indications are produced. Signals from target objects, being superposed upon the clutter, then exceed the threshold level sufficiently to produce satisfactory indications of considerable brilliance. By this adjustment, discrimination in favor of the desired signals and against the undesired signals may be effected. However, when, as in the case of rapid sector scanning, the strengths of indications of both desired and undesired reflections may differ as a function of their angular positions within the scanned sector, the background illumination cannot be adjusted to a value which will simultaneously be optimum for all portions of the sector. For example, when the background illumination is adjusted to provide best indications of target objects near the center of the sector, the clutter near the extremes of the sector will be so strong as to produce excessive illumination of the indicator and to obscure desired indications of target objects in these regions. Conversely, if the background illumination is reduced so as to produce best indications of target objects near the extremes of the sector, target signals near the center of the sector will not be of sufficient strength to produce visually adequate indications in the latter region.

A further disadvantage of sector-scanning arrangements of this type, whether the signals involved be continuous or pulsed oscillations, is that, if the power of the transmitter and the sensitivity of the receiver be chosen to produce adequate indications of objects near the center of the sector, power and sensitivity are in effect being wasted in the production of unnecessarily strong indications near the extremes of the sector.

The reasons for the existence of the above-described difference in the strengths of indications of objects at different angular positions in the scanned sector may be described briefly as follows. In the case of sector scanning, the angular speed of variation of the orientation of the directional axis of the antenna is in general non-uniform, being zero at the extremes of the sector where the direction of scan is reversed, and maximum at an intermediate angle—usually at the center of the sector. As a result, the scanning beam sweeps past an object at the center of the sector more quickly than it sweeps past an object near one of the extremes of the sector. Since the beam dwells longer upon the object near the extreme of the sector, the total amount of energy received from that object is considerably greater than that received from an equivalent object located at the same range but near the center of the scanned sector, and since the strength of each indication produced by such a radar system depends upon the amount of energy received from the corresponding reflecting object, objects near the center of the scanned sector produce relatively weaker indications than do objects near the extremes.

Thus it is seen that the undesirable effects described above are caused by the transmission of different quantities of energy in various directions from an antenna whose beam is caused to scan with a non-uniform angular velocity. This effect exists, and will generally exert a deleterious influence, whether the signals involved be continuous-wave, as in the case of certain radar system for detecting moving objects, or pulsed, as in the case of ordinary radar object locating systems.

Accordingly, it is an object of my invention to provide an improved system for radiating a directional beam of energy and for varying the orientation of said beam, in which system the energy radiated for various orientations of the beam is substantially the same regardless of non-uniformities in the rate at which the orientation of said beam is varied.

Another object is to provide a radar system utilizing an antenna whose beam is caused to scan with a non-uniform angular motion, in which system similar objects located at the same range are illuminated by substantially the same amount of energy.

Still another object is to provide such a radar system in which improved indications of objects may be obtained, and economies in transmitter power realized.

In accordance with the invention, I propose to employ a suitable source supplying signals to a directional antenna, the radiated beam of which is caused to vary in orientation. I then propose to cause the power of signals from the source to vary in accordance with the instantaneous value of the rate of change of orientation of the antenna beam, and preferably in direct proportion thereto. Control of the power may be exerted in response to the motion of the antenna, or, when the scanning motion of the beam is a predetermined function of time, means independent of the antenna motion may be employed to produce the desired control. By these means, the radiated power is increased in those directions for which the rate of change of orientation of the beam is greater and the time interval of illumination correspondingly shorter, and is decreased in those directions which, due to the slower scanning by the beam, are illuminated for longer intervals of time. In this way, the energy radiated in various directions is made more nearly equal, and the energy of reflections from objects at various angular positions and the strengths of corresponding indications similarly equalized.

Although control of the radiated power may be effected by varying proportionally the amplitudes of signals from the source, the desired variation in power may also be realized, in the case of pulsed signals, by varying the recurrence rate of the pulses. Accordingly, in an embodiment of the invention hereinafter described in detail, I employ a source of pulse signals of constant amplitude supplied to a scanning antenna, together with means for controlling the recurrence rate of the pulses in accordance with the scanning motion of the antenna. By these means, the number of pulses transmitted in various directions may be maintained substantially constant despite the non-uniform rate of change of orientation of the antenna beam, and, when reflections of these pulses are utilized to provide indications of objects upon a cathode-ray tube, the indications thus produced, of similar objects at the same range, may be made of substantially equal strengths. Under these conditions, it then becomes possible to adjust the background illumination of the cathode-ray tube to a value which is optimum for discrimination between desired and undesired indications regardless of the angular positions in the scanned region of the corresponding objects, and to realize improvements in the efficiency of operation of the system as set forth more fully hereinafter.

Figure 3:
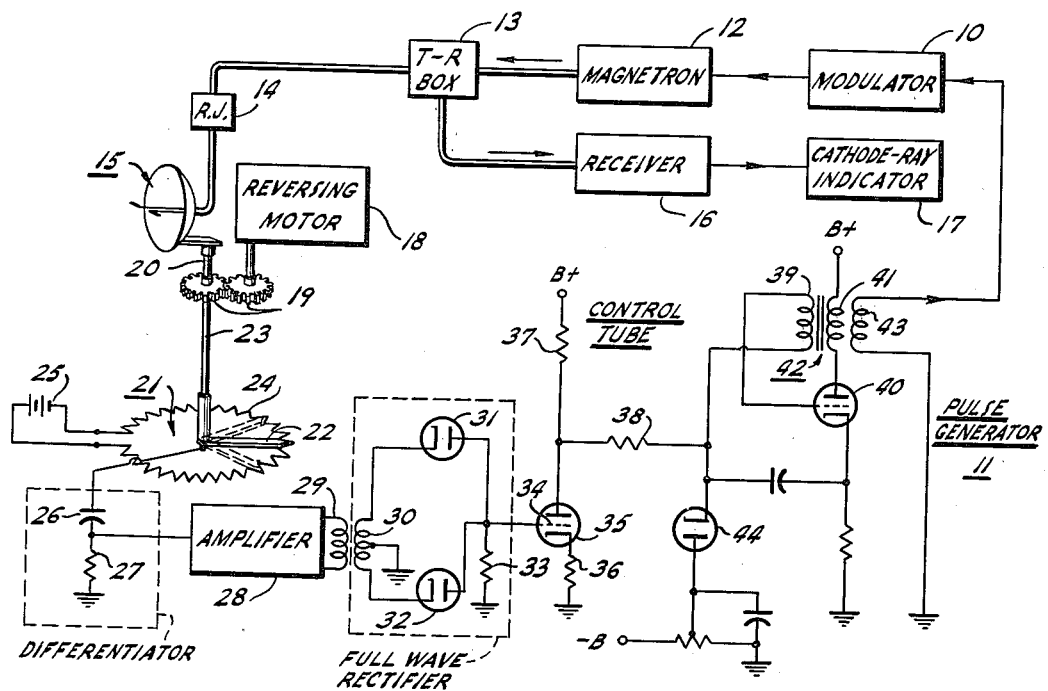
Figure 2A:
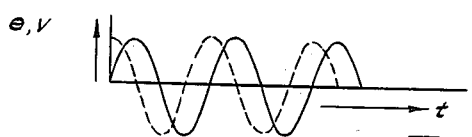
Figure 2B:

Other objects and features of the invention, as well as the arrangement and mode of operation of a representative embodiment thereof, will be readily appreciated from a consideration of the following detailed description together with the accompanying drawings, in which:

Figure 1 is a block diagram of a system embodying the invention and illustrating the principle thereof;

Figures 2A and 2B are graphical representations to which reference will be made in explaining the mode of operation of the embodiments of the invention illustrated in Figures 1 and 3; and Figure 3 is a diagrammatic representation, partly schematic and partly in block form, showing in some detail a pulse-type radar system in which the power of the signals transmitted in various directions is controlled by varying the repetition rate of the pulses, in accordance with the principle of the invention.

Referring to Figure 1, the arrangement shown represents generally a sector-scanning radar system for transmitting signals toward objects lying within a predetermined sector of space and for receiving signals reflected from the same objects. Thus there may be employed a signal source 1 for generating the signals to be radiated, a directional antenna 2 supplied with signals from the source 1 and adapted to be controlled as to the orientation of its directional axis, a beam-scanning device 3 for varying, by electrical or mechanical means, the orientation of the directional axis of antenna 2 so as to cause the beam transmitted by the antenna to scan a predetermined angular sector of space, and a receiver-indicator 4 also connected to antenna 2 and responsive to reflections received by the antenna from objects such as objects 5, 6, and 7 lying within the scanned sector, to produce indications thereof. It is assumed for convenience in explanation that objects 5, 6, and 7 possess identical reflecting properties, and are located at the same range from the antenna.

Signal source 1 is characterized in that it is controllable to vary the power of the signals produced thereby. Thus, if the signal produced is a continuous-wave oscillation —as in certain systems for the detection of moving objects for example—the power may be controlled by varying the amplitude of the oscillation, while if the signal produced comprises a series of time-spaced pulses of oscillations as in many radar applications, the power may also be controlled by varying the repetition rate of the pulses. For example, an increase in the number of pulses produced per second will obviously increase the energy developed per second, which is the power.

Receiver-indicator 4 is characterized in that it produces indications of signal-reflective objects, the strengths of which indications depend upon the total amount of energy received from the objects respectively during a predetermined interval of time, rather than only upon the magnitudes of the reflections. Thus, if the number of pulses received during a given interval varies as a function of time, the strengths of indications will depend not only upon the magnitude of each pulse, but also upon the number of pulses received from each object. This is a common characteristic of many radar receivers, often specifically provided for by the inclusion in the receiver-indicator of a signal integrating device, and aiding in discrimination against noise signals. In one simple form, the integrating device may comprise the phosphor disposed upon the face of the cathode-ray tube in the indicator, which phosphor may have a relatively long persistence so that the brightness of an indication produced at any point thereon depends not only upon the intensity of the cathode-ray beam, but also upon the length of time during which the beam impinges the phosphor at that point, and hence upon the amount of energy received from the corresponding object.

Within these limitations as to the controllability of the signal source to vary the power of the signals therefrom, and as to the integrating characteristic of the receiver-indicator, the portion of the system of Figure 1 thus far described may take any of the large variety of specific forms which are available in the prior art. Thus the beam-scanning device 3 may cause the beam radiated by antenna 2 to vary its angular position in any manner as a function of time. However, for convenience in explanation, it will be assumed that the antenna beam is caused to oscillate back and forth, between two extreme angular positions separated by an angle A, in a sinusoidal manner—that is, so that its angular displacement $\theta$ from a reference position at the center of the scanned sector is proportional to sine $t$, where $t$ represents time. Such a variation may be approximated by oscillating the entire antenna structure by means of a reversing motor which periodically reverses its direction of rotation, and is approximated even more closely when a mechanically-resonant scanning mechanism is associated therewith in a manner well known in the art.

The variation of the angular displacement $\theta$ as a function of time is represented graphically in the full-line graph of Figure 2A, wherein the horizontal dimension represents time and the vertical dimension represents the angular displacement $\theta$. Also shown is a graph in broken line representing the manner in which the angular velocity of rotation V of the beam then varies as a function of time. Since the angular velocity is the derivative $$\frac{d\theta}{dt}$$

of the angle with respect to time, it is proportional in this case to function cosine $t$.

Comparison of the graphs of $\theta$ and of V indicates that the angular speed, which is the magnitude of the angular velocity without regard to the direction of rotation, is maximum when the beam points directly forward ($\theta$=zero), and is zero when the beam occupies either extreme angular position. Although the invention is not restricted to such arrangements, it will be conducive to an understanding of the invention to consider the case in which the beamwidth is small compared to the angular amplitude of scan A. Under this condition, which commonly obtains, it may be stated that the energy striking any object within the scanned sector during each sweep of the beam from one extreme position to the other, is equal to the power of the signal impingent upon the object, multiplied by the time required for the beam to sweep over the object while rotating at the particular speed characterizing the motion of the beam at that portion of the sector, where the object considered is assumed to subtend an angle smaller than the angular beam width. Thus, if the angular width of the radiated beam is $\Delta\theta$, and the angular speed S, the time required for the beam to sweep over an object is $$\frac{\Delta\theta}{S}$$

and the energy impingent upon the object is $$\frac{\Delta\theta}{S} \cdot P$$

where P is the power of the radiated signal. It is then clear that, in an arrangement constructed in accordance with the prior art, the energy impinging each object is inversely proportional to the angular speed and is therefore less for objects, such as 5, located at the center of the sector where S is large, than for objects such as 6 and 7 situated near the extremes thereof. As a result, the reflected energy received from these objects in a conventional system varies in a similar manner, and produces indications of objects 6 and 7 which are considerably stronger than the indication produced in response to object 5 located at the center of the sector. It is understood that there will, in general, also be present within the scanned sector, a source of clutter signals, e. g. ground or sea return, and that the strengths of the indications of such undesired signals will also exhibit this tendency to appear stronger near the extremes of the sector than near the center thereof.

It is pertinent here to point out that cathode-ray tube indicators commonly employed in the radar art are susceptible of saturation in that, when the light emitted by the phosphor in response to bombardment by the cathode-ray electron beam attains a predetermined relatively great intensity, additional moderate increases in either the strength of the electron beam or the time of illumination by the beam are substantially ineffective to produce further increases in intensity of readily discernible magnitude. Under these conditions the indicator may be said to be saturated. Furthermore, when the illumination of the phosphor is very low, small increases in the energy supplied by the beam to any particular spot on the phosphor will again produce no visually distinguishable increase in the intensity of light from the indicator. In this event, the signals applied to the indicator may be described as being below the threshold level of the indicator. However, by suitable adjustment of the background illumination of the cathode-ray tube, it is generally possible to adjust the indicator for maximum incremental sensitivity to signals supplied thereto. When the applied signals comprise undesired clutter signals on which are superposed desired target signals, the adjustment of the indicator which produces best enhancement of desired target signals with respect to clutter signals, depends upon the magnitude of the clutter signals simultaneously present. Thus if the clutter signals are excessively strong, saturation of the indicator is produced in response thereto, and the desired target signals are not able to produce readily distinguishable increases in the intensity of indications. On the other hand, if the clutter signals are too weak, the desired target signals will lie below the threshold level of the indicator, with the result that inadequate indications are again produced.

In view of the foregoing, it is clear that the indicator cannot be adjusted, in systems of the prior art, to a single value which will produce optimum enhancement of indications of desired targets at all angular positions, because of the variations of the magnitude of the clutter signals as the antenna beam is rotated. For, when the antenna is directed along the extremes of the scanned sector, the energy of the clutter signals and therefore the strength of the clutter indications, are much greater than when the antenna is directed along the center of the sector. As a result, the indicator tends to be saturated by the clutter signals near the extremes of the scanned sector, and to be insufficiently activated for indications near the center of the sector. Although it will generally be possible to adjust the indicator to provide adequate indications of target objects located at specified points equally displaced from the center of the sector, it will not be possible to realize maximum enhancement for target objects at all angles.

This difficulty is obviated by the arrangement of applicant's invention as represented in Figure 1. An angular speed data transmitter 8 is provided, which is responsive to the motion of the beam-scanning device, or of the antenna itself, to produce an output control signal proportional to the angular speed of rotation of the antenna beam. Devices suitable for such use as data transmitters are well known in the art, may take any of a variety of forms, and may be connected to the beam-scanning device or to the antenna in a variety of ways. For example, the data transmitter may be a mechanical device similar to the well-known ball-type rotating governor, caused to rotate, through a suitable gearing system, in response to rotation of the antenna structure, and operative to produce a mechanical output signal proportional to angular speed as represented by the outward motion of the balls. It may alternatively comprise an electromechanical device such as a generator, in which a coil of wire is rotated in a magnetic field in response to the motion of the antenna to produce an electrical signal proportional to the angular velocity of rotation of the antenna, together with full-wave rectifying means for producing a signal proportional to the corresponding angular speed. Still another arrangement, employing a rotating potentiometer, a differentiator, and a full-wave rectifying device, is described later herein with reference to Figure 3. Such arrangements are well known in the prior art, and it will therefore be unnecessary here to describe the structures thereof in detail.

Figure 2B represents graphically the manner in which the control signal from angular speed data transmitter 8 may vary as a function of time when the velocity of the antenna varies in time in the manner represented in Figure 2A. The output signal of the data transmitter may be a voltage E which varies in the manner represented in Figure 2B. It is seen that the control signal is zero when the antenna beam is at either extreme, and increases to a maximum value when the beam rotates through the center of the sector.

The control signal developed by data transmitter 8 is applied to a power controlling device 9, which in turn is connected to signal source 1 and which serves to vary the power of the signal supplied by the source to antenna 2 in proportion to the magnitude of the control signal. Such control may be effected by the mechanical variation of a power controlling element, or by the electrical effect of a circuit element upon the source, for examples. Various ways of achieving such control are known in the art, one of which is exemplified hereinafter with reference to Fig. 3.

Since the control signal is proportional to the angular speed of rotation of the antenna beam, it is seen that the power of the signal radiated by the antenna is caused to increase as the beam approaches the center of the scanned sector and to decrease again as the beam approaches either extreme where its velocity is minimum. Objects situated near the extremes of the sector, such as objects 6 and 7, which are illuminated for relatively long periods of time, are therefore impinged by signals of lower power than are objects near the center of the sector, such as object 5, which is illuminated for shorter periods of time. Thus, by increasing the radiated power when the scanning speed is high, and decreasing the power when the scanning speed is low, the amount of radiated energy striking objects of equivalent reflectivities at the same range and at any angular position in the sector, is maintained substantially constant.

The theory of operation of the arrangement of Figure 1 may be expressed briefly as follows. The energy radiated in any direction by antenna 2 equals the power of the signal transmitted in that direction multiplied by the duration of the interval during which power is so radiated, or, expressed mathematically, $$E_\theta = P_\theta \cdot \Delta t$$

where $E_\theta$ is the energy radiated at any angle $\theta$ during one sweep of the beam from one extreme to the other, which quantity it is desired to maintain constant, $P_\theta$ is the power of the signal radiated at the same angle $\theta$, and $\Delta t$ is the duration of the interval during which energy is radiated in this direction. As noted hereinbefore, $$\Delta t = \frac{\Delta \theta}{S}$$

and hence, $$E_\theta = P_\theta \cdot \frac{\Delta \theta}{S}$$

Since the beam-width $\Delta \theta$ is maintained substantially constant, $E_\theta$ is proportional to $P_\theta / S$. Thus to overcome the variation of $E_\theta$ which is produced in conventional systems by the variation of S during scanning, applicant provides apparatus which causes $P_\theta$ to vary in proportion to S, thereby counteracting the variation which would otherwise be produced by variations in S. Mathematically expressed, $P_\theta$ is caused to equal $K \cdot S$, where $K$ is a constant of proportionality determined by the system parameters. Then, $$E_\theta = \frac{K \cdot S}{S} = K$$

demonstrating the constancy of $E_\theta$ when the principle of applicant's invention is employed.

The desired variation of $P_\theta$ in proportion to S may be obtained, as described hereinbefore, by employing an angular-speed data transmitter 8 to derive a control signal proportional to S, and using this control signal to produce a proportional control of the power from source 1, through the agency of a power control device 9.

When the energy radiated in all directions within the scanned sector is maintained constant in accordance with the principle of applicant's invention, the energies of reflections from objects within the sector are no longer a function of the angular positions of the objects, and the strength of the indications of clutter signals is substantially uniform. It therefore becomes possible to adjust the voltage threshold of the indicator to a value which is optimum for enhancing the presentation of target objects at all angular positions within the sector, and thus to obviate the deleterious effects attending operation in accordance with the prior art. This adjustment is ordinarily one for which the clutter signals produce indications of relatively low intensity.

It is further noted that, when a system arranged in accordance with applicant's invention is employed, a certain predetermined amount of power is necessary from the signal source when the antenna beam is at the center of the sector, in order to produce satisfactory indications of objects at the sector center. This amount of power is also utilized by prior art systems to irradiate all objects in the scanned sector. However, in the case of applicant's system, the signal source produces this amount of power only when the beam is at the center of the sector, the radiated power being less when the antenna beam departs from the center of the sector and reaching a considerably lower value near the extremes of the sector. Thus it will be apparent that, in applicant's system, the average power of the signal from source 1 is considerably reduced from that employed in a conventional system, whereby economy in the construction and use of the equipment may be realized.

Referring to the representation of Figure 3, illustrating a more detailed embodiment of the invention, there is shown a pulsed radar system of the sector-scanning type in which the power of signals from the source is controlled by varying the repetition rate of the transmitted pulses in response to variations in the angular speed of rotation of the radiating antenna. Thus there is shown a conventional modulator 10, adapted to be triggered by keying pulses supplied thereto from a pulse generator 11, so as to produce modulating pulses of predetermined duration and magnitude in response to said keying pulses. Connected with the modulator may be a transmitter, such as a conventional magnetron 12, adapted to produce pulses of high frequency energy in response to modulating pulses applied thereto. In the present instance, the carrier frequency of the pulsed oscillations may suitably lie in the microwave band. Pulses from the transmitter are delivered through T-R box 13 and rotating joint 14 to scanning antenna 15 for radiation into spaced and toward signal-reflective objects. T-R box 13 may be entirely conventional, being adapted to transmit signals from magnetron 12 to antenna 15 with but slight attenuation, while preventing their substantial transmission therethrough to receiver 16, and is further adapted to provide for the transmission of reflected signals received by antenna 15 to receiver 16 without excessive loss in signal power. Receiver 16 may be of the type conventionally employed in radar systems, comprising for example a superheterodyne amplifier adapted to produce video pulses indicative of reflections from target objects. Connected with the receiver may be a cathode-ray indicator 17, provided with suitable deflecting voltages for producing a modified PPI type of presentation in which, on the screen of the indicator, there is scanned, by the electron beam thereof, a sector corresponding to the sector scanned by the antenna 15. The screen of cathode ray indicator 17 may preferably employ a phosphor of relatively long persistence, so as to function as an integrating device, whereby the intensity of indications produced thereon in response to signal-reflective objects is caused to depend upon the amount of energy reflected from the objects respectively, as explained hereinbefore with reference to Figure 1.

Shown also are means for causing antenna 15 to oscillate in a sector-scanning fashion, these means including a reversing motor 18 and driving gears 19 by which the rotary motion produced by the motor is imparted to a shaft 20 upon which the antenna is mounted for rotation. Reversing motor 18 is adapted periodically to change the direction of rotation of its shaft so as to produce the desired oscillatory scanning motion of the beam from the antenna. Rotating joint 14 is employed in the usual manner to permit the rotational motion of antenna 15, while allowing the connection to T-R box 13 from the rotating joint to remain stationary. Since antenna structures and driving mechanisms for producing sector-scanning are well known in the art, it is not necessary to show the details of their construction. However, it is again desirable, in the interests of simplicity of explanation, to assume that the scanning-motion of antenna 15 is a sinusoidal function of time. As pointed out hereinbefore, such scanning motions will be closely approximated when the reversing motor producing rotation of the antenna is used in conjunction with a mechanically-resonant drive system. Thus the angular displacement $\theta$ of the beam of radiation from antenna 15, is again represented graphically by the full-line curve of Figure 2A.

It will be seen that the portion of the system of Figure 3 thus far described may be entirely conventional in arrangement and construction, and that if modulator 10 operates to produce pulses recurrent at a constant repetition rate, this portion of the system will produce upon the screen of cathode-ray indicator 17 indications of target objects lying within the scanned sector, but will be subject to the disadvantageous effects associated with such prior art systems as described hereinbefore. Thus, if modulator 10 produces pulses at a constant repetition rate, the increase in the angular speed of scan of the beam from antenna 15, in the vicinity of the center of the scanned sector, causes a reduction in the number of pulses illuminating target objects located near the center of the scanned sector and hence a decrease in the number of received pulses indicative of such objects and supplied to cathode-ray indicator 17. As a result, the number of signal pulses effectively integrated by the phosphor of the cathode-ray indicator is substantially reduced, and the intensity of the corresponding indication produced thereby upon the phosphor decreased. On the other hand, objects located near the extremes of the scanned sector where the angular velocity of rotation of the antenna beam is relatively low, will be subjected to illumination by a substantially greater number of pulses, and there will be a substantially greater number of corresponding pulses applied to cathode-ray indicator 17. As a result, the integration of this larger number of pulses by the phosphor of the indicator produces indications of target objects, which indications are of substantially greater intensity, for equivalent objects at the same range, than are the indications of objects near the center of the scanned sector. As in the case of the embodiment of Figure 1, the differences in the intensity of indications produced by reflections from the ground at various angular positions from the antenna, then may make it impossible to adjust the voltages supplied to the cathode-ray indicator so as to provide optimum enhancement of indications of target objects situated at all angular positions.

To overcome this difficulty, there is provided, in accordance with the invention, a rotating potentiometer 21 whose rotatable contacting arm 22 is mechanically coupled to the shaft 20 with which the antenna is rotated, by any suitable mechanical means here exemplified by shaft 23. Potentiometer 21 comprises in essence a resistance element 24 arranged in the form of an arc of a circle and supplied at the two ends thereof by a source of constant voltage comprising battery 25, together with arm 22 which is adapted to be rotated about an axis at the center of the arc formed by the resistance element. Arm 22 rotates about shaft 23 in response to the rotational motion of shaft 20, while making sliding contact with resistance element 24. Thus the point at which arm 22 contacts resistance element 24 is varied cyclically in accordance with the scanning motion of antenna 15. Since the voltage drop per unit length along resistance element 24 is constant, there is generated on rotating arm 22 a voltage which varies in proportion to the angular departure of the beam of antenna 15 from the center of the scanned sector. The form of the voltage developed on arm 22 is therefore the same as that of $\theta$ as represented by the full-line curve of Figure 2A.

To obtain from this signal a voltage proportional to the angular velocity of scan of antenna 15, a differentiating circuit of conventional type may be employed. Arm 22 may therefore be connected to one terminal of a capacitor 26 whose other terminal is connected to ground through a resistor 27. By appropriately choosing the values of capacitor 26 and resistor 27 in accordance with principles well known in the prior art, the current through resistor 27 may be made substantially equal to the derivative of the voltage applied to condenser 26. The voltage across resistor 27 then is proportional to the angular velocity of rotation of antenna 15. Since, as is commonly the case, the differentiating circuits described may produce considerable attenuation of the signal passing therethrough, the differentiated signal may be passed through an amplifier 28 which serves to increase the signal level to a conveniently usable value.

The signal from amplifier 28 then possesses the form of the curve shown in broken line in Figure 2A, and is directly proportional to the angular velocity of scanning. From this signal, it is desired to derive a voltage which is proportional to the angular speed of rotation of the antenna beam, without regard to the direction of scanning. The need for this step is obvious from the consideration that it is desired to provide the same power in the transmitted signals for each of any two positions of the beam equally displaced on either side of the center of the scanned sector. The desired form of control signal then equals the absolute magnitude of the signal from the differentiator, and may be obtained by passing the signal from amplifier 28 through a conventional full-wave rectifying device.

The signals from amplifier 28 are therefore passed through a transformer 29 whose secondary winding 30 is grounded at a center-tap thereof. Opposite ends of secondary winding 30 are connected respectively to the cathodes of separate diode tubes 31 and 32. The plates of diodes 31 and 32 are connected together, and through a resistance 33 to ground. When the sinusoidal signal from amplifier 28 causes the upper end of secondary winding 30 to become negative with respect to ground, current flows through tube 31 and resistor 33 in series, producing a negative voltage across the resistance. During the other half-cycle of the sinusoidal signal, diode 32 conducts, permitting current to flow in the same direction as before through resistor 33, and again producing a negative voltage. The resultant full-wave rectified voltage is then applied to the control grid 34 of a control tube 35, which may comprise a triode vacuum tube whose cathode is connected to ground through a conventional biasing resistor 36, and whose plate is connected through a plate load resistor 37 to a suitable source of positive potential designated B+. The rectified signal from across resistor 33 therefore appears at the plate of control tube 35, amplified and inverted in phase. The plate voltage of control tube 35 then comprises a control signal which is used to control the repetition rate of pulses produced by pulse generator 11.

The form of the control voltage at the plate of control tube 35 is represented in the graph of Figure 2B, the vertical dimension representing voltage and the horizontal dimension, time.

This control voltage is caused to effect a substantially proportional variation of the repetition rate of pulses from pulse generator 11, which may comprise a blocking oscillator, by variation of the positive grid return voltage of the oscillator. Thus the plate of control tube 35 is connected through resistor 38 and blocking transformer winding 39 to the grid of vacuum tube 40 of pulse generator 11. This pulse generator is seen to comprise in essence a conventional blocking tube oscillator. The general operation of such devices being well known in the art, it will be unnecessary to describe in detail the functioning thereof. Suffice it to point out that the plate of tube 40 is connected through primary winding 41 of a blocking transformer 42 to a source of positive supply voltage, the secondary winding 39 of which transformer is regeneratively coupled to the grid of the same tube. Blocking transformer 42 is of conventional design, having an iron core whose nature and function are well known, and a tertiary winding 43 across which the desired output keying pulses are delivered. One end of secondary winding 39 of transformer 42 is connected to the grid of tube 40, the other end being connected to the resistor 38, which, as hereinbefore noted, is connected at its other terminal to the plate of control tube 35. Tube 40 and its associated circuits are adapted to function in a manner well known in the art to produce a series of time-spaced pulses of current through primary 41 of transformer 42 at a rate determined by the value of the plate voltage of control tube 35.

Also associated with the blocking oscillator is a peak-limiting diode 44, whose cathode is connected to the junction of resistor 38 and secondary winding 39, and whose plate is connnected to a fixed source of voltage which is slightly less negative than the greatest negative excursion of the grid voltage of tube 40. This diode is useful in improving the stability of operation of the pulse generator, by insuring that the greatest negative excursion of the grid voltage of tube 40 remains constant at a value substantially equal to the above-mentioned negative supply voltage.

Pulses from the primary of transformer 42 are coupled to tertiary winding 43, whence they are delivered to modulator 10 to control the generation therein of suitable modulating pulses, as described hereinbefore.

In the operation of the system of Figure 3, the directional axis of antenna 15 is scanned rapidly back and forth in the manner represented by the sinusoid of Figure 2A. Shaft 20, rotating with antenna 15, is coupled to rotating arm 22 of potentiometer 21, and causes the development at said arm of a sinusoidal voltage whose amplitude is at all times proportional to the angular departure of the directional axis of antenna 15 from its central position in the scanned sector. The signal at arm 22 is differentiated by the combination of capacitor 26 and resistor 27 to produce a signal whose instantaneous amplitude is proportional to the angular velocity of scan of directional axis 15, and which varies in the general manner indicated by the broken-line graph of Figure 2A. The differentiated signal is amplified and full-wave rectified so as to derive a control signal at the plate of control tube 35 which varies in accordance with the angular speed of scan. The form of this control voltage is represented in Figure 2B. It will be seen that when the radiated beam from antenna 15 is directed along one extreme of the scan sector, the control voltage is zero. Under these conditions, pulse generator 11 is adapted to produce time-spaced pulses recurrent at a predetermined, relatively low rate. Thus objects such as 6 and 7, which lie near the extremes of the scanned sector, are illuminated for a comparatively long time by the radiated beam, but during this time of illumination are subjected to impingement by relatively few pulses of energy. However, as the beam is rotated to a position at the center of the scanned sector, the control voltage increases to its maximum value. As a result of the increased control voltage, the repetition rate of the pulses generated by pulse generator 11 is greatly increased, with the result that, although an object such as 5 located at the center of the scanned sector is subjected to illumination for only a comparatively short period of time, it is nevertheless irradiated by substantially the same number of pulses as are objects 6 and 7 located near the extremes. Reflections of substantially equal energy are therefore received from objects 5, 6, and 7, and corresponding indications of substantially equal strengths are produced upon indicator 17.

Similarly, clutter signals returned from the ground, for example, also produce signals of substantially equal strengths regardless of their angular positions. Accordingly, the bias of cathode-ray tube indicator 17 may be so adjusted that the clutter signals applied thereto produce equal indications at all angles of the sector, and substantially equal enhancements of desired indications of target objects at all angular positions in the sector may therefore be obtained.

Although the invention has been described with particular reference to radar systems, it will be apparent that it is susceptible of divers embodiments, and will find utility in various other applications. For example, the provision by the invention of substantially equal energy-radiation in all directions is not limited to use in systems utilizing the intermediate step of object reflection, but will also find application in arrangements in which it is desired to radiate energy directly to a receiver situated within a region scanned by an antenna beam, which energy shall be substantially the same regardless of the angular position of the receiver within the region. Also, the non-uniform motion of the directional axis of the antenna may be produced in response to any type of force, whether an electrical or mechanical force of predetermined magnitude, or by a randomly varying force such as might be caused by chance fluctuations of a supply voltage or fortuitous gusts of wind interfering with the operation of a system employing a normally-uniform scanning motion. Furthermore, it will be understood that, although, in a preferred embodiment of the invention, the power of the transmitted signal is caused to vary in direct proportion to the angular speed of rotation of the directional axis of the antenna, the advantages of the invention will also be realized by any arrangement which causes the transmitted power to be increased when the angular speed of scanning is increased, and reduced as the scanning speed is decreased.

I claim:

1. In a system for the radiation of energy, a directional scanning antenna structure, said antenna structure being angularly movable to vary the direction of radiation thereby, means for controlling the motion of said antenna structure to vary the direction of radiation of energy thereby, said means operating to vary the direction of radiation of said antenna structure at a non-uniform rate, means for supplying said antenna structure with signal power for radiation, and means responsive to motion of said antenna structure for controlling said last-named means to vary the power radiated by said antenna in the same sense as variations in said velocity of angular motion of said antenna structure.

2. In an energy-radiating system, a scanning antenna structure for radiating wave energy in a directional radiation pattern, means for controlling said antenna structure to effect rotation of said radiation pattern, said last-named means being operative to rotate said pattern with a non-uniform angular velocity, means for supplying said antenna structure with energy for radiation, and means for varying the radiated power from said antenna structure in the same sense as variations in said angular velocity of rotation of said radiation pattern.

3. A system according to claim 2 in which said means for varying the radiated power is operative to vary said power substantially in direct proportion to variations in said angular velocity of rotation of said radiation pattern.

4. In an energy-radiating system, a scanning antenna structure for radiating wave energy in a directional radiation pattern, means for controlling said structure to rotate said radiation pattern with a non-uniform angular velocity, signal-translating means for supplying said antenna structure with energy to be radiated, said signal-translating means being controllable to vary the power supplied to said antenna structure, and means for controlling said signal-translating means to vary the power supplied to said antenna structure in the same sense as variations in said angular velocity of rotation of said radiation pattern.

5. A system according to claim 4 in which said signal-translating means for supplying energy to said antenna structure comprises a source of time-spaced pulses of energy which is controllable to vary the rate of recurrence of said pulses and therefore the power supplied to said antenna structure.

6. A system according to claim 4 in which said means for controlling said antenna structure to produce rotational motion of the radiation pattern thereof is also operative to control said signal-translating means to vary the power supplied to said antenna structure.

7. In an object detecting system of the reflection type, a scanning antenna structure for radiating wave energy in a directional radiation pattern, means for controlling said antenna structure to effect rotation of said radiation pattern, said last-named means being operative to rotate said pattern with a non-uniform angular velocity, means for supplying said antenna structure with energy for radiation, means for varying the power radiated by said antenna structure in the same sense as variations in said angular velocity of rotation of said radiation pattern, a receiver of reflections of said radiated power from target objects, and an indicator for producing indications of said received reflections, the indications produced by said indicator being subject to variation as a function of the average power of said received reflections.

8. In an energy-radiating system, a scanning antenna structure for radiating wave energy in a directional radiation pattern which is subject to rotational motion, means for controlling said structure to rotate said pattern with a non-uniform angular velocity, means for generating a signal which varies in amplitude in response to rotational motion of said radiation pattern, and means responsive to said signal for varying the power radiated by said antenna structure in the same sense as said variations in said angular velocity of rotation of said radiation pattern.

9. A system according to claim 8 in which said last-named means includes means responsive to said generated signal for generating a second signal which varies in response to variations in the angular velocity of rotation of said antenna structure, and means for utilizing said second signal to control the power radiated by said antenna structure.

References Cited in the file of this patent

UNITED STATES PATENTS

| | | |
|---|---|---|
| Re. 23,006 | Moseley | Dec. 21, 1948 |
| 2,442,695 | Kock | June 1, 1948 |
| 2,470,939 | Miller et al. | May 24, 1949 |
| 2,490,660 | Speer | Dec. 6, 1949 |
| 2,513,962 | Patterson | July 4, 1950 |
| 2,529,823 | Starr | Nov. 14, 1950 |
| 2,539,905 | Herbst | Jan. 30, 1951 |